(12) United States Patent
Healey et al.

(10) Patent No.: US 9,871,820 B2
(45) Date of Patent: Jan. 16, 2018

(54) TECHNOLOGIES FOR MANAGING NETWORK PRIVILEGES BASED ON PHYSICAL PRESENCE

(71) Applicant: Intel Corporation, Santa Clara, CA (US)

(72) Inventors: Jennifer A. Healey, San Jose, CA (US); Kenneth T. Anderson, Portland, OR (US); John C. Weast, Porland, OR (US); Tobias M. Kohlenberg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 14/583,686

(22) Filed: Dec. 27, 2014

(65) Prior Publication Data
US 2016/0191565 A1 Jun. 30, 2016

(51) Int. Cl.
*G06F 7/04* (2006.01)
*H04L 29/06* (2006.01)

(52) U.S. Cl.
CPC .......... *H04L 63/164* (2013.01); *H04L 63/10* (2013.01); *H04L 63/107* (2013.01); *H04L 63/108* (2013.01)

(58) Field of Classification Search
CPC ....... G06F 21/31; G06F 21/10; H04L 63/083; H04L 63/08
See application file for complete search history.

(56) References Cited

U.S. PATENT DOCUMENTS

| | | | |
|---|---|---|---|
| 8,011,015 B2* | 8/2011 | Singer | G06F 21/10 380/201 |
| 8,131,214 B2* | 3/2012 | Braun | H04M 1/7253 455/41.1 |
| 2005/0027837 A1 | 2/2005 | Roese | |
| 2006/0010491 A1 | 1/2006 | Prigent | |
| 2006/0072527 A1 | 4/2006 | Beck | |
| 2008/0051076 A1 | 2/2008 | O'Shaughnessy | |
| 2014/0189802 A1* | 7/2014 | Montgomery | H04L 63/08 726/4 |

(Continued)

OTHER PUBLICATIONS

International Search Report for PCT/US15/062685, dated Mar. 8, 2016 (3 pages).

(Continued)

*Primary Examiner* — Ali Abyaneh
(74) *Attorney, Agent, or Firm* — Barnes & Thornburg LLP

(57) ABSTRACT

Technologies for managing network privileges of members of graft-network include detecting a computing device in physical presence with a network infrastructure, determining whether the computing device is a member of the graft-network, and establishing initial network privileges for the computing device if the computing device is not a member, without direct programming of the member. The network privileges of members of the graft-network are updated over time as a function of the length of time for which the computing device is in physical presence of the network infrastructure. A computing device may be in physical presence of the network by physical contacting a communication bus of the network infrastructure or being within a limited communication range of the communication bus. New members to the graft-network may be quarantined to reduce risk to the network.

25 Claims, 5 Drawing Sheets

(56) References Cited

U.S. PATENT DOCUMENTS

2014/0359303 A1* 12/2014 Berke ................... G06F 21/73
  713/189
2014/0362836 A1* 12/2014 Locker ................. H04W 4/023
  370/338

OTHER PUBLICATIONS

Written Opinion for PCT/US15/062685, dated Mar. 8, 2016 (8 pages).

* cited by examiner

TECHNOLOGIES FOR MANAGING NETWORK PRIVILEGES BASED ON PHYSICAL PRESENCE

BACKGROUND

With the proliferation of smart devices, such as smart appliances, smart tools, smart accessories, and the like, management of the communication networks used by such smart devices can be a serious security and/or privacy concern. However, many of present day and future smart devices have minimal or no user interfaces with which to manage the device. Setting up and managing a local network for such devices can be extremely complex and overly difficult for an average user. An unmanaged network can expose data to untrustworthy devices resulting in a security or privacy breach. Oftentimes, the user may not even know which devices belong to which network.

Many smart devices are configured to participate in local area or wide area networks. The smart devices may have substantial communication abilities allowing the smart devices to communicate with other devices throughout a location. Such medium or long range communication further increases the security and privacy concerns for a user, especially in light of the growing number of smart devices owned by the typical user. Although a user may be able to maintain a local area network with some degree of security and privacy, such maintaining can become a constant chore for the user as new devices are added to the network and old devices are removed.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
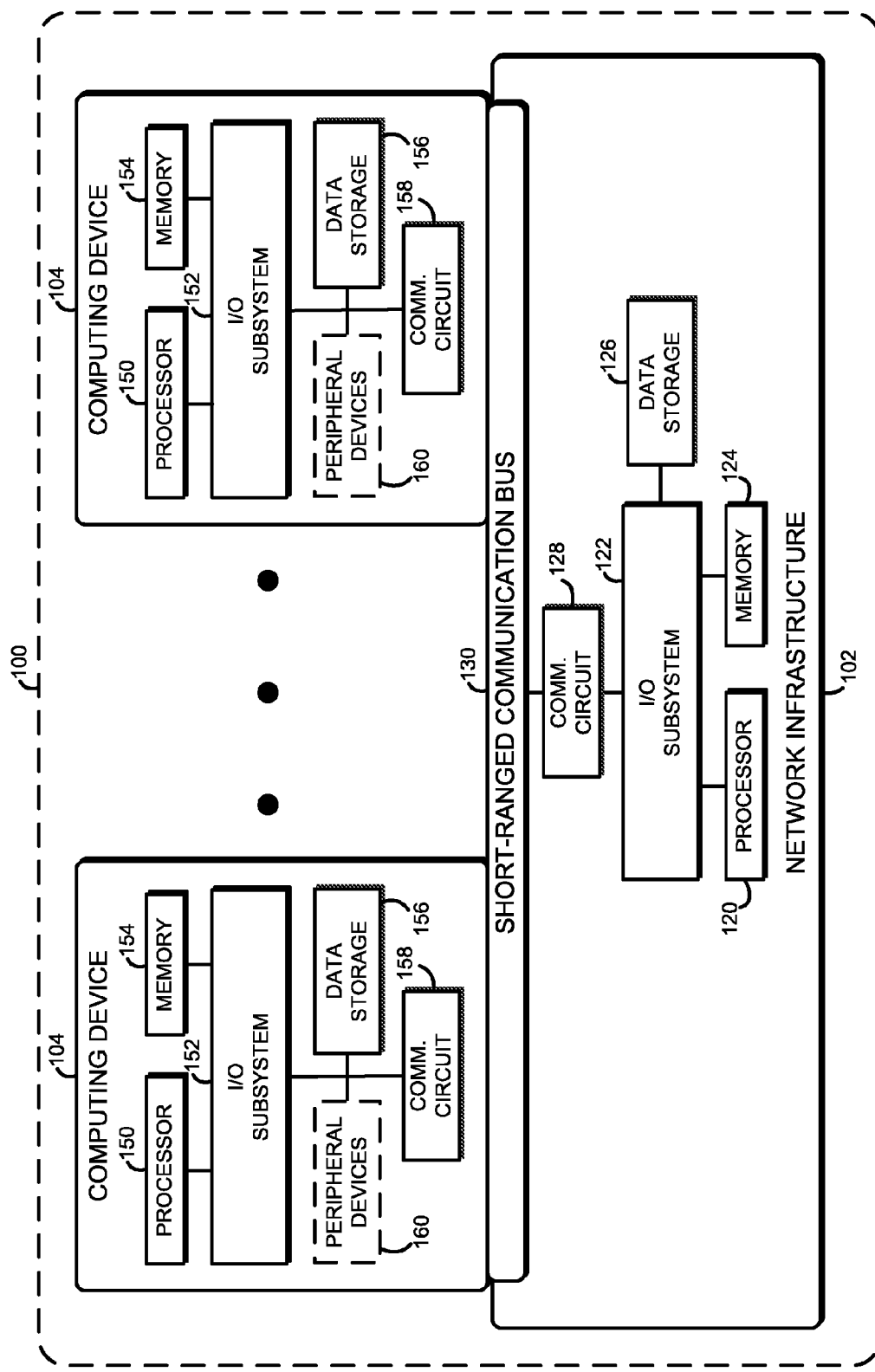
FIG. 1 is a simplified diagram of at least one embodiment of a graft-network including a network infrastructure and a plurality of computing device members.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A or C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative graft-network 100 includes a network infrastructure 102 and one or more computing devices 104 configured to communicate with each other via the network infrastructure 102. The computing devices 104, which may be embodied as smart devices, may communicate with each other to share or propagate information, policies, and/or other data. As discussed in more detail below, the network infrastructure 102 is configured to facilitate the communications between members of the graft-network 100 (e.g., computing devices 104) while enforcing associated network privileges. To increase the security of the graft-network 100, a new member of the graft-network 100 is provided network privileges over time based on a physical presence of the new member with the network infrastructure 102. That is, membership in the graft-network 100 is dependent on the amount of time a computing device 103 has been in physical contact or otherwise highly proximal to the network infrastructure 102. New members to the graft-network 100 may be quarantined and provided limited or no network privileges, while "older" members may have full network privileges. In this way, members are "grafted" to the graft-network 100 over time. Additionally, the speed at which a computing device 104 may gain network privileges may be modified based on other criteria, such as attestations from other members of the graft-network 100, user interaction, and/or activity of the particular computing device 104 relative other members of the graft-network 100 and/or other trusted computing devices. In this way, new members may join the graft-network 100, or similar protected network, without explicit programming to do so. Rather, physical proximity to the graft-network 100 is used to bind members as discussed below.

The network infrastructure 102 may be embodied as any type of computing device capable of facilitating communications between the computing devices 104 and performing the additional functions described herein. For example, the network infrastructure 102 may be embodied as, or otherwise include, a router, a switch, a hub, access point, a data server, a computer, a multiprocessor system, a processor-based system, a consumer electronic device, and/or any other computing device capable of facilitating communications between the computing devices 104 utilizing the technologies described herein. As shown in FIG. 1, the illustrative network infrastructure 102 includes a processor 120, an I/O subsystem 122, a memory 124, a data storage 126, a communication circuit 128, and a short-ranged communication bus 130. Of course, the network infrastructure 102 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments The processor 120 may be embodied as any type of processor capable of performing the functions described herein. For example, the processor 120 may be embodied as a single or multi-core processor(s), a single or multi-socket processor, a digital signal processor, a microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the network infrastructure 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the network infrastructure 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the network infrastructure 102, on a single integrated circuit chip.

The data storage 126 may be embodied as any type of device or devices configured for the short-term or long-term storage of data. For example, the data storage 126 may include any one or more memory devices and circuits, memory cards, hard disk drives, solid-state drives, or other data storage devices.

The communication circuit 128 may be embodied as any communication circuit, device, or collection thereof, capable of enabling communications between the computing devices 104 using any suitable communication protocol and/or technology. To do so, the communication circuit 128 utilizes the short-range communication bus 130 to receive and transmit communications with each computing device 104.

The short-range communication bus 130 may be embodied as any type of communication architecture capable of facilitating communication between the computing devices 104 while enforcing physical presence of the computing devices 104 with the network infrastructure 102. For example, in some embodiments, the short-range communication bus 130 may be embodied as an electrically conductive bus, such as a conductive strip, which must be physically connected by a computing device 104 to communicate across the communication bus 130. In other embodiments, short-range communication bus 130 may be embodied as an array of short-ranged communication devices or antennas, which have an extremely short communication range so as to require the computing devices 104 to be in physical contact with the network infrastructure 102 or highly proximal thereto. For example, in one embodiment, the communication range of the short-range communication bus 130 is less than one inch. Of course, in other embodiments, the short-range communication bus 130 may be embodied as other structure, circuits, or devices capable of facilitating communications between the computing devices 104 while enforcing physical presence of the computing device 104 with the network infrastructure 102.

Each of the computing devices 104 may be embodied as any type of computing device capable of communicating with the network infrastructure. For example, in some embodiments, each of the computing devices 104 may be embodied as a mobile or stationary smart device including, but not limited to, a smart appliance, smart clothing, a smart accessory, a smart watch, a smart wallet, a smart tool, smart keys, smart glasses, smart dishware, or other smart device. As such, the computing devices 104 may or may not have user interfaces to facilitate direct user interaction, which may complicate a user's ability to manage each computing device 104 (e.g., to set the network privileges of each computing device 104).

As shown in FIG. 1, each illustrative computing device 104 includes a processor 150, an I/O subsystem 152, a memory 154, a data storage 156, a communication circuit 158, and peripheral devices 160. Of course, each computing device 104 may include other or additional components, such as those commonly found in a smart device or computer (e.g., various input/output devices), in other embodiments. Additionally, in some embodiments, one or more of the illustrative components may be incorporated in, or otherwise form a portion of, another component. For example, the memory 154, or portions thereof, may be incorporated in the processor 150 in some embodiments Similar to the processor 120 of the network infrastructure 102, the processor 150 may be embodied as any type of processor capable of performing the functions described herein. For example, the processor 150 may be embodied as a single or multi-core processor(s), a single or multi-socket processor, a digital signal processor, a microcontroller, or other processor or processing/controlling circuit. Similarly, the memory 154 may be embodied as any type of volatile or non-volatile memory or data storage capable of performing the functions described herein. In operation, the memory 154 may store various data and software used during operation of the computing device 104 such as operating systems, applications, programs, libraries, and drivers. The memory 154 is communicatively coupled to the processor 150 via the I/O subsystem 152, which may be embodied as circuitry and/or components to facilitate input/output operations with the processor 150, the memory 154, and other components of the computing device 104. For example, the I/O subsystem 152 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 152 may form a portion of a system-on-a-chip (SoC) and be incorporated, along with the processor 150, the memory 154, and other components of the computing device 104, on a single integrated circuit chip.

The data storage 156 may be embodied as any type of device or devices configured for the short-term or long-term storage of data. For example, the data storage 156 may include any one or more memory devices and circuits, memory cards, hard disk drives, solid-state drives, or other data storage devices. The communication circuit 158 may be embodied as any communication circuit, device, or collection thereof, capable of enabling communications with other computing devices 104 of the graft-network 100 using the short-ranged communication bus 130. The peripheral devices 160 may include any type of peripheral device commonly found in a computer device, for example, a hardware keyboard, input/output devices, peripheral communication devices, and/or other peripheral devices depending on the type of device 104.

Figure 2:
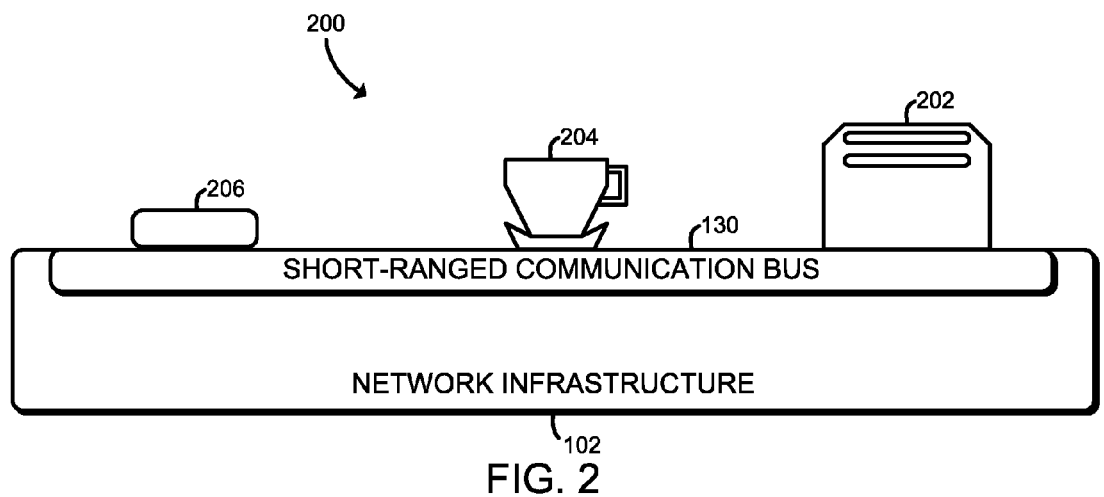
FIG. 2 is a simplified illustration of at least one additional embodiment of the graft-network of FIG. 1.
Figure 3:
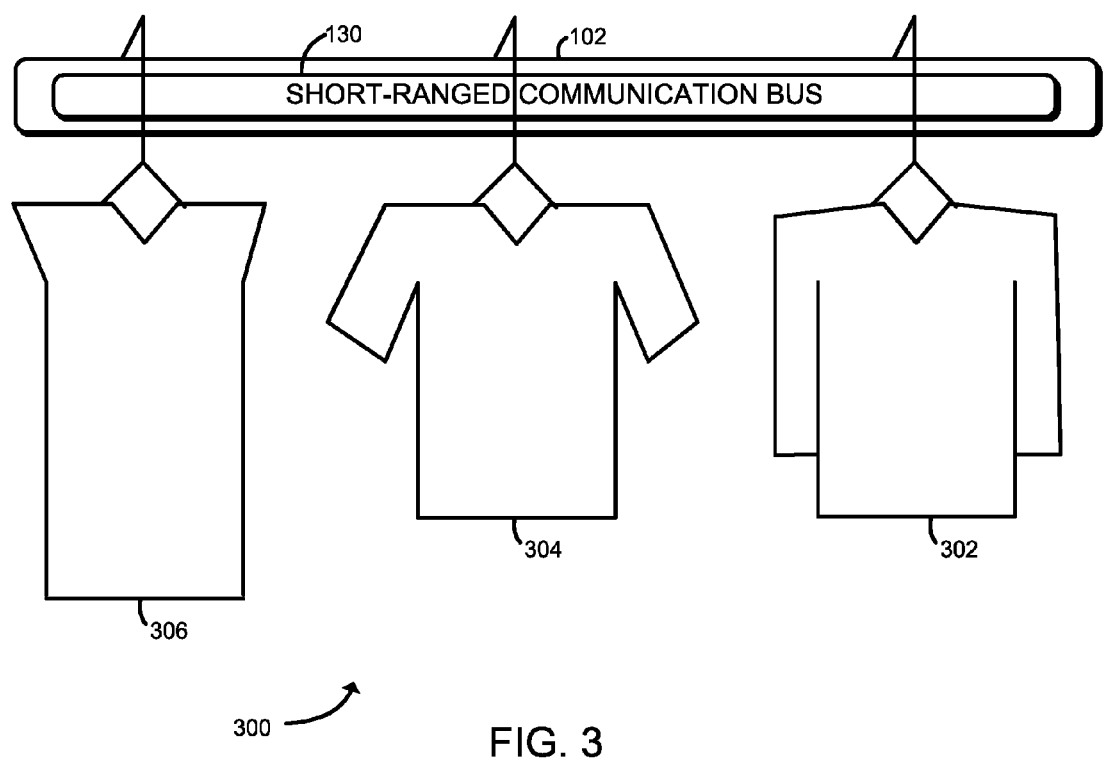
FIG. 3 is a simplified illustration of at least one additional embodiment of the graft-network of FIG. 1.

Referring now to FIGS. 2 and 3, the network infrastructure 102 may be embodied as any type of structure or device capable "grafting" members to the graft-network 100 over time and performing the other functions described herein. For example, as shown in FIG. 2, the network infrastructure 102 may be embodied as, or otherwise included in, a smart counter 200. In the illustrative embodiment, the computing devices 104 are likewise embodied as a smart toaster 202, a smart cup 204, and a smart wallet 206. As discussed above, the network infrastructure 102 increases the network privileges of the smart toaster 202, a smart cup 204, and a smart wallet 206 based on the temporal length of their physical presence with the network infrastructure. In some embodiments, each of the smart toaster 202, the smart cup 204, and the smart wallet 206 may be in physical contact with the short-ranged communication bus 130. For example, the short-ranged communication bus 130 may be embodied as a conductive strip embedded in a top surface of the counter; and the smart toaster 202, the smart cup 204, and the smart wallet 206 may include a conductive antenna or communication device configured to make physical contact with the short-ranged communication bus 130 to facilitate communications across the graft-network 100. Alternatively, the short-ranged communication bus 130 may be embodied as an antenna or an array of antenna configured for short-ranged communications, which may require the smart toaster 202, the smart cup 204, and the smart wallet 206 be placed on the counter or in extremely proximity to the counter to communicate across the graft-network 100. If one of the smart devices, such as the smart wallet 206, is a new member to the graft-network 100, the smart wallet will have reduced network privileges compared to the smart cup 204 or the smart toaster 202. For example, the smart wallet 206 may be able to receive communications from the smart cup 204 and/or smart toaster 202, but may not be able to transmit communications across the graft-network 100.

Alternatively, as shown in FIG. 3, the network infrastructure 102 may be embodied as, or otherwise included in, a smart space such as a smart closet 300. In the illustrative embodiment, the computing devices 104 are likewise embodied as smart clothes 302, 304, 306. Again, as discussed above, the network infrastructure 102 increases the network privileges of the smart clothes 302, 304, 306 based on the temporal length of their physical presence with the network infrastructure 102. In some embodiments, each of the smart clothes 302, 304, 306 may be in physical contact with the short-ranged communication bus 130. For example, the short-ranged communication bus 130 may be embodied as a conductive closet rod; and the smart clothes 302, 304, 306 may include a conductive antenna or communication device configured to make physical contact with the short-ranged communication bus 130 through a corresponding conductive or smart hanger 310, 312, 314. Alternatively, the short-ranged communication bus 130 may be embodied as an antenna or an array of antenna configured for short-ranged communications and embedded in the closet rod, which may require the smart clothes 302, 304, 306 be hung in place on the closet rod in close proximity to the short-range communication bus.

Figure 4:
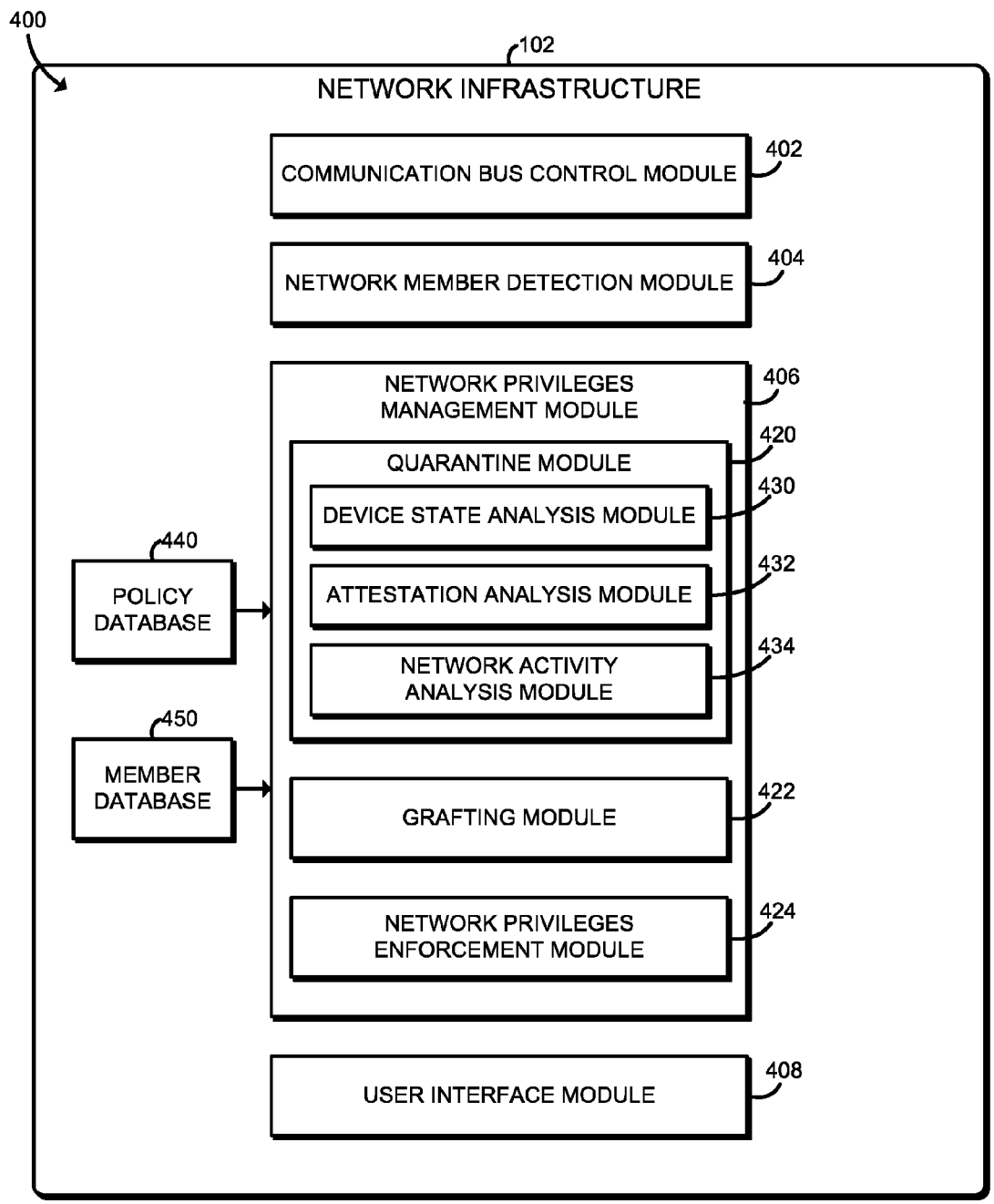
FIG. 4 is a simplified block diagram of at least one embodiment of an environment that may be established by the network infrastructure of the graft-network of FIG. 1.

Referring now to FIG. 4, in use, the network infrastructure 102 may establish an environment 400. The illustrative environment 400 includes a communication bus control module 402, a network member detection module 404, a network privileges management module 406, and a user interface module 408. Each of the modules and other components of the environment 400 may be embodied as firmware, software, hardware, or a combination thereof. For example the various modules, logic, and other components of the environment 400 may form a portion of, or otherwise be established by, the processor 120, the I/O subsystem 122, an SoC, or other hardware components of the network infrastructure 102. As such, in some embodiments, any one or more of the modules of the environment 400 may be embodied as a circuit or collection of electrical devices (e.g., a communication bus control circuit, a network member detection circuit, a network privileges management circuit, etc.).

The communication bus control module 402 controls the short-ranged communication bus 130 to facilitate communications between the members of the graft-network 100 (i.e., computing devices 104). To do so, the communication bus control module 402 may utilize any suitable communication protocol or technology. For example, in embodiments in which the short-ranged communication bus 130 is embodied as a conductive bus to enforce physical contact by the computing device 104, the communication bus control module 402 may utilize a wired communication protocol or technology to facilitate communications between the computing devices 104. Alternatively, in embodiments in which the short-range communication bus 130 is embodied as an array of antennas, the communication bus control module 402 may utilize a wireless communication protocol or technology to facilitate communications between the computing devices 104.

The network member detection module 404 is configured to detect the physical presence of computing devices 104 with regard to the network infrastructure 102. As discussed above, the physical presence of a computing device 104 may be embodied as a physical contact with the short-ranged communication bus 130 or physical presence within extremely close proximity (e.g., less than 1 inch) to the short-ranged communication bus 130, which is indicative of the physical presence of the computing device 104. As such, the network member detection module 404 may detect the physical presence of a computing device 104 by determining whether the computing device 104 is physically contacting the short-ranged communication bus 130 or is within communication range of the short-ranged communication bus 130. The network member detection module 404 may detect physical contact of the computing device 104 using any suitable methodology such as contact detection based on capacitive or resistive sensing, or current or power draw. Additionally or alternatively, the network member detection module 404 may detect the physical presence (e.g., close proximity) of a computing device 104 based on communications received from the computing device 104 on the short-ranged communication bus 130 (e.g., in response to an interrogation broadcast from the network member detection module 404).

The network privileges management module 406 is configured to manage the network privileges of the members of the graft-network 100. As discussed above, the network privileges management module 406 is configured to extend or increase network privileges of the members of the graft-network 100 based on the length of time for which the member has been physically present with regard to the network infrastructure 102. The speed at which network privileges are extended may be based on a temporal policy stored in a policy database 440, along with other policies as discussed below.

As discussed above, new members to the graft-network 100 may be "quarantined" or otherwise given selective or no network privileges. For example, a new member may be restricted from transmitting and/or receiving all communications on the network, transmitting and/or receiving certain types of data, limited to communications only during certain time period, and so forth. As such, network privileges management module 406 includes a quarantine module 420 configured to manage new members to the graft-network 100 (e.g., determine a set of initial network privileges for the new member), as well as older members that have been absent from the graft-network for some time. To do so, the quarantine module 420 includes a device state analysis module 430, which is configured to analyze a context state of the computing device 104 member of the graft-network. The context state of a computing device 104 may be indicative of whether the computing device is "cleaned" (e.g., set to an original equipment manufacturer context state) or "dirty" (e.g., having communicated with other unknown devices in the past). Additionally, the context state may be indicative of whether the computing device 104 has been physically present or has been away from the graft-network 100 for an extended period of time. The quarantine module 420 may adjust the speed at which new privileges are acquired by a computing device 104 member of the graft-network 100 based on the context state of the computing device 104. For example, a computing device 104 having an original equipment manufacturer context state may be provide a large amount of network privileges initially. Again, the amount of adjustment given, and related policies may be stored in the policy database 440.

The quarantine module 420 also includes an attestation analysis module 432 and a network activity analysis module 434. The attestation analysis module 432 is configured to analyze any attestations received from other members of the graft-network 100 for the new or returning member. For example, a highly trusted (i.e., highly privileged) member may attest to the trustworthiness of a new or returning member. If the attestation analysis module 432 determines the attestation is sufficient, the attestation analysis module 432 may also adjust the speed at which network privileges are provided to the new or returning member. Similarly, the network activity analysis module 434 analyzes the network activity of the new or returning member to determine, for example, whether such activity is supportive of membership or is suspicious. The analyzed network activity may include communications with other members of the graft-network 100 and/or other communications and/or interactions with other trusted computing devices from other networks (e.g., members of other graft-networks 100). The network activity data may be acquired by the network activity analysis module 434 over time, provided by the computing device 104, or provided by another computing device 104 similar to an attestation. Again, the amount of adjustment given for network activity, and related policies may be stored in the policy database 440.

The network privileges management module 406 also includes a grafting module 422, which is configured extend network privileges to members of the graft-network 100 based on the length of time each member has been physically present with respect to the network infrastructure 102. To do so, the grafting module 422 may monitor the physical presence of members and record the length of time the members have been present. The grafting module 422 may update the network privileges of the members based on the recorded length of time according to a temporal policy stored in the policy database 440, which may dictate the temporal speed at which members may obtain network privileges. In some embodiments, the grafting module 422 also updates the network privileges of members based on other criteria. For example, similar to the quarantine module 420, the grafting module 422 may update network privileges based on the context state of the computing device 104, an attestation from another member of the graft-network 100, and/or the network activity of the member.

The network privileges extended and managed by the grafting module 422 may be embodied as any type of privileges associated with a communication network. For example, the network privileges may define the type of data a member can exchange with another member, the volume of data that can be exchanged by the member, the regularity at which the member can communicate (e.g., the member may only communicate within a certain period of time), the ability to communicate with members or networks outside the graft-network 100, and/or other network privileges. Additionally, in some embodiments, the network privileges may include the sharing of network policies or other data sensed or obtained by members of the graft-network 100.

The network privileges management module 406 also includes a network privileges enforcement module 424, which enforces the network privileges of each member of the graft-network 100. For example, if a computing device 104 member has a set of network privileges that dictate the computing device 104 can only communicate within a defined time period, the network privileges enforcement module 424 will ensure the computing device 104 cannot communicate outside the defined time period (e.g., by blocking communication from and/or to the computing device 104 during the defined time period). In some embodiments, if the computing device 104 attempts a network action for which it does not have a corresponding network privilege (e.g., attempting to communicating outside a defined time period), such attempt may cause the grafting module 422 to reduce the network privileges of the computing device 104. To enforce the network privileges of members, the network privileges enforcement module 424 may retrieve privilege data from a member database 450 that identifies the associated network privileges for each member.

As discussed above, some of the computing devices 104 may have limited or no user interface capabilities, thereby limiting the user's ability to manage or configure the computing device 104. As such, the user interface module 408 may be used by a user of the network infrastructure to manage each computing device 104 and/or the network infrastructure 102. For example, the user interface module 408 may facilitate the user's ability to adjust or modify the network privileges of a computing device 104. The user interface module 408 may utilize a physical interface, a virtual interface, or wireless interface to provide such functionality. For example, the user interface module 408 may be configured to communicate with another device to provide the user interface.

Figure 5:
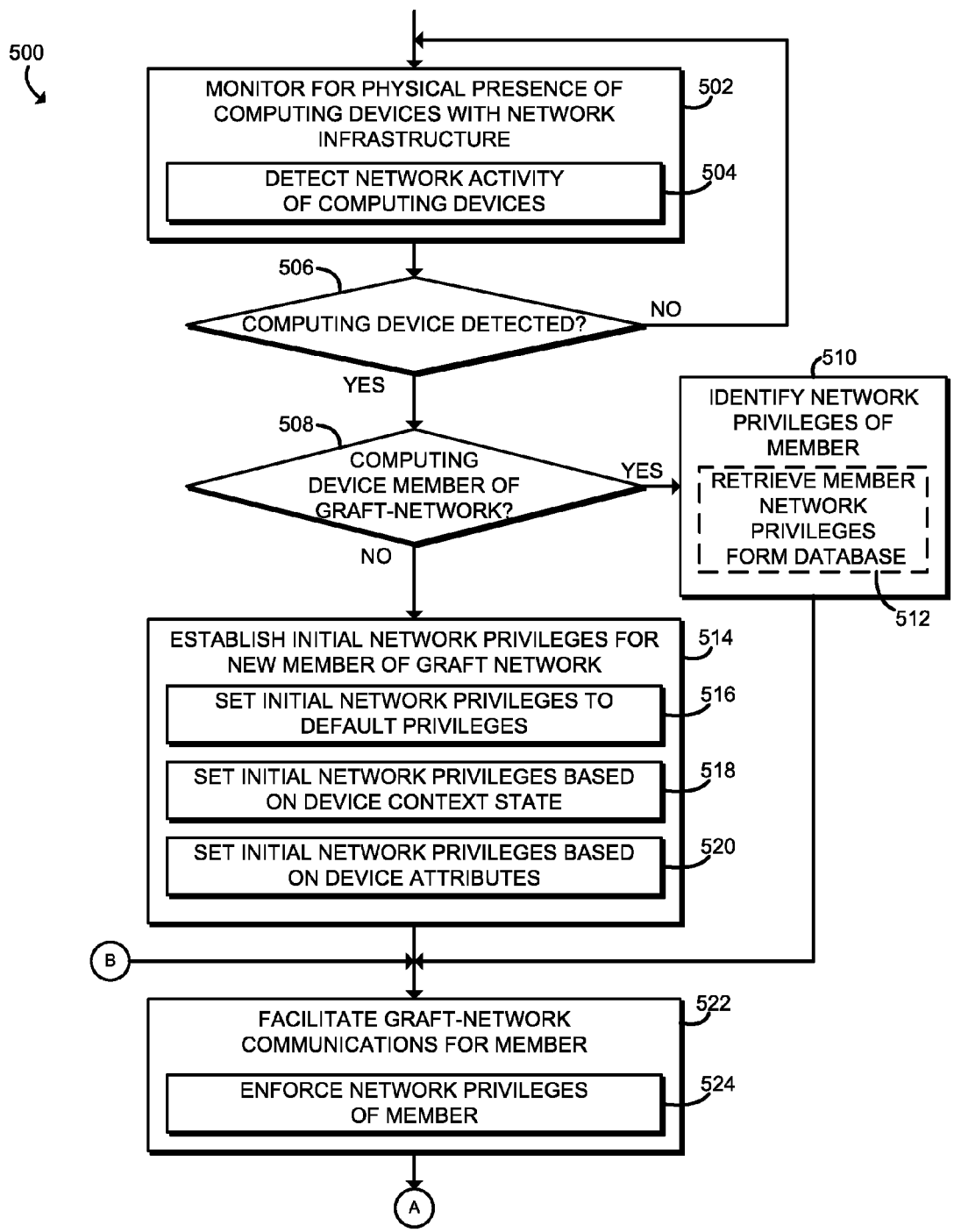
FIGS. 5 and 6 are a simplified flow diagram of at least one embodiment of a method for managing network privileges of members of a graft-network.
Figure 6:
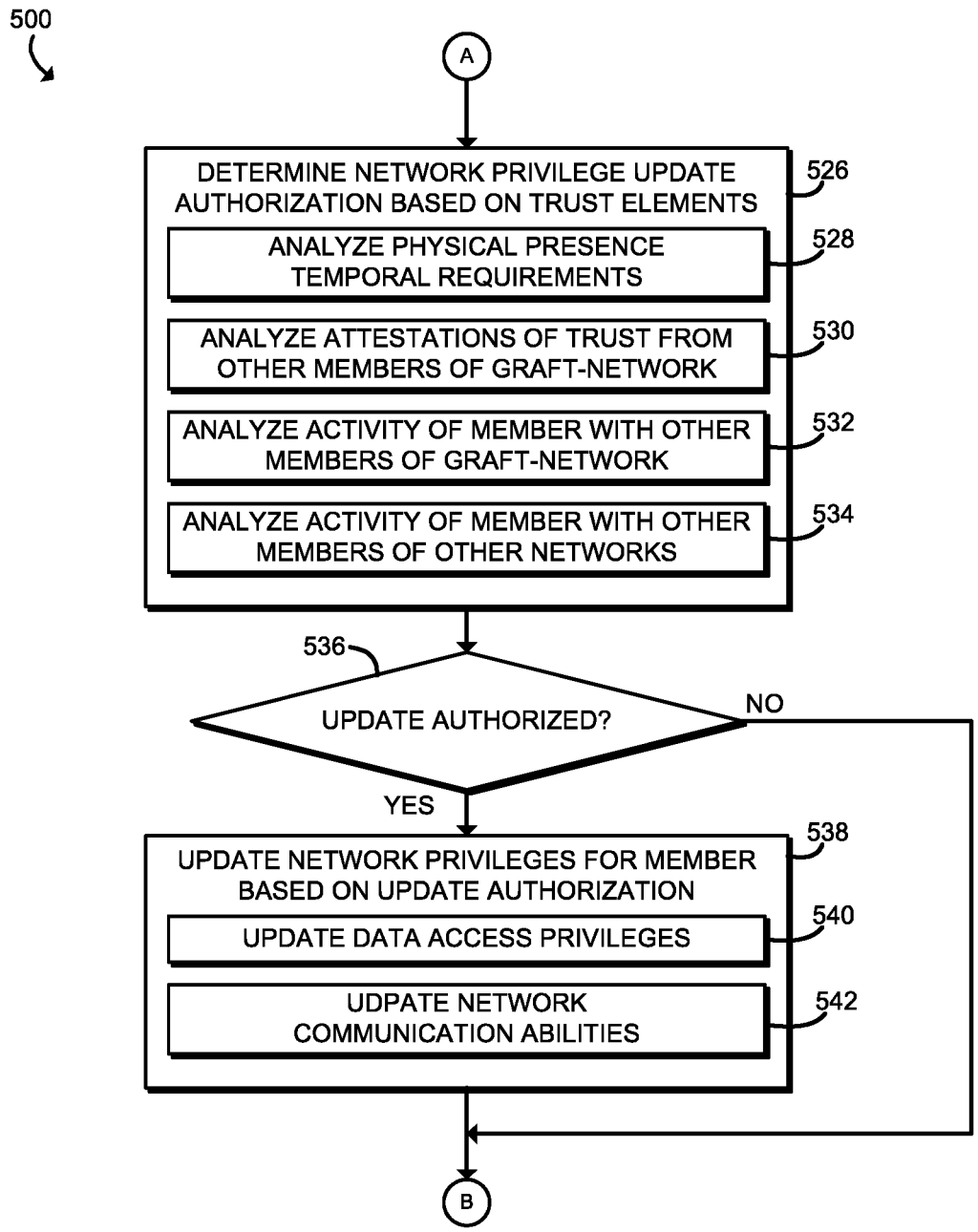

Referring now to FIGS. 5 and 6, in use, the network infrastructure 102 may execute a method 500 for managing network privileges of members of the graft-network 100. The method 500 begins with block 502 in which the network infrastructure 102 monitors for the physical presence of computing device 104 with the network infrastructure 102. As discussed above, the monitored physical presence may be embodied as physical contact or extreme proximity with the short-ranged communication bus 130. Additionally, in some embodiments, the determination of whether physical presence is met may be based on a co-location with an existing member (e.g., an "advisor" member of the graft-network).

If the network infrastructure 102 detects a computing device 104 in physical presence with the short-ranged communication bus 130 in block 506, the method 500 advances to block 508 in which the network infrastructure 102 determines whether the computing device 104 is an existing member of the graft-network 100. To do so, the network infrastructure 102 may obtain identification data from the computing device 104 and compare the identification data to the member database 450.

If the computing device 104 is determined not to be an existing member of the graft-network 100 (e.g., the computing device 104 is a new member), the method 500 advances to block 514 discussed below. However, if the computing device 104 is determined to be an existing member of the graft-network 100, the method 500 advances to block 510. In block 510, the network infrastructure 102 identifies the current network privileges of the member. For example, in block 512, the network infrastructure 102 may retrieve indicia of the current network privileges of the member from the member database 450. After the current network privileges for the member have been determined in block 510, the method 500 advances to block 522 in which the network infrastructure 102 facilitates graft-network communication as discussed in more detail below.

Referring back to block 508, if the computing device 104 is determined not to be an existing member of the graft-network 100, the method 500 advances to block 514. In block 514, the network infrastructure 102 establishes initial network privileges for the new member. To do so, in block 516, the network infrastructure 102 may set the initial network privileges to default privileges for new members. Additionally or alternatively, the network infrastructure 102 may adjust or set the initial network privileges of the new member based on the context state of the computing device 104 in block 518. Further, in block 520, the network infrastructure 102 may adjust or set the initial network privileges of the new member based on device attributes of the new member. For example, if the computing device 104 has attributes of a computing device expected to communicate with graft-network 100 (e.g., a smart cup attempting to graft to a smart counter), the network infrastructure 102 may adjust the initial network privileges positively. If, however, the computing device 104 has attributes of a computing device not expected to communicate with graft-network 100 (e.g., a smart shirt attempting to graft to a smart counter), the network infrastructure 102 may adjust the initial network privileges negatively.

After the initial network privileges have been set for the new member in block 514 or retrieved for an existing member in block 510, the method 500 advances to block 522 in which the network infrastructure 102 facilitates communications of the computing device 104 members across the graft-network 100. In doing so, the network infrastructure 102 enforces the network privileges of each member in block 524. To do so, as discussed above, the network infrastructure 102 may ensure that each member is behaving in a manner in accordance with their assigned network privileges (e.g., not using too much bandwidth, accessing appropriate data, communicating at the appropriate times, etc.). Additionally, in some embodiments, the network infrastructure 102 may inform each computing device 104 of the network privileges of other members of the graft-network 100 such that each computing device 104 member can help police the use of network privileges.

Subsequently, in block 526 of FIG. 6, the network infrastructure 102 determines whether to authorize an update or modification to the network privileges of any member physically present in the graft-network 100. That is, as the network infrastructure 102 is facilitating graft-network 100 communications of the members, the network infrastructure 102 monitors the members to determine whether each member has earned an increase (or decrease) in network privileges. For example, in block 528, the network infrastructure 102 analyze the physical presence temporal requirements for network privileges to determine whether a computing device 104 member has earned an increase in network privileges. As discussed above, members of the graft-network 100 "graft" to the network 100 over time (and continued good behavior) and, as such, are provided increase network privileges as a function of the length of time for which the member has been physically present with regard to the network infrastructure 102. As such, in block 528, the network infrastructure 102 determines whether each member has been physical present for a sufficient amount of time to warrant an increase or adjust in network privileges.

Additionally, in block 530, the network infrastructure 102 determines whether another member of the graft-network 100 has provided an attestation for the current member. Further, the network infrastructure 102 may analyze the activity of each member with other members of the graft-network 100 in block 532 and/or with members of other network in block 534. The activity of the member may positively or negatively impact its network privileges.

Subsequently, in block 536, the network infrastructure 102 determines whether an update to network privileges for each member has been earned or is otherwise required. If so, the method 500 advances to block 538 in which the network infrastructure 102 updates the network privileges for a member based on the update authorization for the particular member. For example, in block 540, the network infrastructure 102 may update the data access privileges of the member (e.g., the type and/or amount of data the member can access, etc.). Additionally or alternatively, in block 542, the network infrastructure 102 may update the network communication abilities of the member (e.g., when the member can communicate, the speed at which the member may communicate, etc.). After the network infrastructure 102 has updated the network privileges of any desiring member or if no update has been authorized, the method 500 loops back to block 522 in which the network infrastructure 102 continues to facilitate communication across the graft-network 100 while enforcing the network privileges of each member. In this way, the network infrastructure 102 manages and updates the network privileges of members of the graft-network 100 based on the length of time during which the member is physically present with regard to the network infrastructure 102. Such temporal-based acquisition of network privileges improves the security of the graft-network 100 and reduces the likelihood of accidental joining of the network by other devices (e.g., a smart device left on the counter for only short time).

In other embodiments, other means to "graft" a new member to the graft-network may be used. For example, membership may be based on proximity as discussed above as well as

EXAMPLES

Illustrative examples of the devices, systems, and methods disclosed herein are provided below. An embodiment of the devices, systems, and methods may include any one or more, and any combination of, the examples described below.

Example 1 includes a network infrastructure for managing network privileges of members of a graft-network, the network infrastructure comprising a network member detection module to (i) detect a computing device in physical presence with the network infrastructure and (ii) determine whether the computing device is a member of the graft-network; a network privileges management module to set initial network privileges for the computing device in response to a determination that the computing device is not a member of the graft-network, wherein the initial network privileges define at least a type of data accessible by the computing device over the graft-network, wherein the network privileges management module is further to update the initial network privileges of the computing device as a function of the time for which the computing device is in physical presence with the network infrastructure.

Example 2 includes the subject matter of Example 1, and further comprising a communication bus, and wherein to detect the computing device in physical presence with the network infrastructure comprises to determine whether the computing device is in physical contact with the communication bus of the network infrastructure.

Example 3 includes the subject matter of any of Examples 1 and 2, and further including a communication bus, and wherein to detect the computing device in physical presence with the network infrastructure comprises to determine whether the computing device is within a reference communication range with the communication bus of the network infrastructure.

Example 4 includes the subject matter of any of Examples 1-3, and wherein the reference communication range comprises one inch.

Example 5 includes the subject matter of any of Examples 1-4, and wherein to detect the computing device in physical presence with the network infrastructure comprises to detect network communication on the graft-network from the computing device.

Example 6 includes the subject matter of any of Examples 1-5, and further including a member database that identifies members of the graft-network and network privileges associated with each member of the graft-network, and wherein the network member detection module is to access the member database to determine whether the computing device is a member of the graft-network.

Example 7 includes the subject matter of any of Examples 1-6, and wherein the initial network privileges comprise default privileges.

Example 8 includes the subject matter of any of Examples 1-7, and wherein to set the initial network privileges for the computing device comprises to determine a context state of the computing device; and set the initial privileges based on the determined context state.

Example 9 includes the subject matter of any of Examples 1-8, and wherein to determine the context state of the computing device comprises to determine whether the context state of the computing device has been set to an original equipment manufacturer context state.

Example 10 includes the subject matter of any of Examples 1-9, and wherein to set the initial network privileges for the computing device comprises to determine a set of attributes of the computing device; and set the initial privileges based on the determined set of attributes.

Example 11 includes the subject matter of any of Examples 1-10, and wherein to update the initial network privileges comprises to update initial network privileges of the computing device based on a trust attestation received from another member of the graft-network.

Example 12 includes the subject matter of any of Examples 1-11, and wherein to update the initial network privileges comprises to analyze activity of the computing device with another member of the graft-network; and update initial network privileges of the computing device based on the analyzed activity.

Example 13 includes the subject matter of any of Examples 1-12, and wherein the activity of the computing device comprises at least one of (i) the type of data exchanged with the another member, (ii) the volume of data exchanged with the another member, (iii) the regularity of communications with the another member, or (iv) historical data indicative of past activity with the another member.

Example 14 includes the subject matter of any of Examples 1-13, and wherein to update the initial network privileges comprises to increase the types of data accessible by the computing device over the graft-network.

Example 15 includes the subject matter of any of Examples 1-14, and wherein to update the initial network privileges comprises to increase the amount of data accessible by the computing device over the graft-network.

Example 16 includes the subject matter of any of Examples 1-15, and wherein to update the initial network privileges comprises to increase the network communication abilities of the computing device over the graft-network.

Example 17 includes the subject matter of any of Examples 1-16, and wherein the network privileges management module is further to facilitate communication of the computing device over the communication bus of the graft-network and enforce the network privileges associated with the computing device.

Example 18 includes the subject matter of any of Examples 1-17, and wherein network privileges management module is further to identify network privileges of the computing device in response to a determination that the computing device is a member of the graft-network and facilitate communication of the computing device over the communication bus of the graft-network and enforcing the network privileges of the computing device.

Example 19 includes the subject matter of any of Examples 1-18, and wherein to identify the network privileges of the computing device comprises to access a member database to retrieve data indicative of the network privileges of the computing device.

Example 20 includes the subject matter of any of Examples 1-19, and wherein the computing device comprises a smart appliance, smart clothing, a smart accessory, or a smart tool.

Example 21 includes a method for managing network privileges of members of a graft-network, the method comprising detecting, by a network infrastructure of the graft-network, a computing device in physical presence with the network infrastructure; determining, by the network infrastructure, whether the computing device is a member of the graft-network; setting, by the network infrastructure, initial network privileges for the computing device in response to determining that the computing device is not a member of the graft-network, wherein the initial network privileges define at least a type of data accessible by the computing device over the graft-network; and updating the initial network privileges of the computing device as a function of the time for which the computing device is in physical presence with the network infrastructure.

Example 22 includes the subject matter of Example 21, and wherein detecting the computing device in physical presence with the network infrastructure comprises determining whether the computing device is in physical contact with a communication bus of the network infrastructure.

Example 23 includes the subject matter of any of Examples 21 and 22, and wherein detecting the computing device in physical presence with the network infrastructure comprises determining whether the computing device is within a reference communication range with a communication bus of the network infrastructure.

Example 24 includes the subject matter of any of Examples 21-23, and wherein determining whether the computing device is within a reference communication range comprises determining whether the computing device is within one inch from the communication device.

Example 25 includes the subject matter of any of Examples 21-24, and wherein detecting the computing device in physical presence with the network infrastructure comprises detecting network communication on the graft-network from the computing device.

Example 26 includes the subject matter of any of Examples 21-25, and wherein determining whether the computing device is a member of the graft-network comprises accessing, by the network infrastructure, a member database to determine whether the computing device is a member of the graft-network, wherein the member database identifies members of the graft-network and network privileges associated with each member of the graft-network.

Example 27 includes the subject matter of any of Examples 21-26, and wherein setting the initial network privileges for the computing device comprises setting the initial privileges to default privileges.

Example 28 includes the subject matter of any of Examples 21-27, and wherein setting the initial network privileges for the computing device comprises determining a context state of the computing device; and setting the initial privileges based on the determined context state.

Example 29 includes the subject matter of any of Examples 21-28, and wherein determining the context state of the computing device comprises determining whether the context state of the computing device has been set to an original equipment manufacturer context state.

Example 30 includes the subject matter of any of Examples 21-29, and wherein setting the initial network privileges for the computing device comprises determining a set of attributes of the computing device; and setting the initial privileges based on the determined set of attributes.

Example 31 includes the subject matter of any of Examples 21-30, and wherein updating the initial network privileges comprises updating initial network privileges of the computing device based on a trust attestation received from another member of the graft-network.

Example 32 includes the subject matter of any of Examples 21-31, and wherein updating the initial network privileges comprises analyzing activity of the computing device with another member of the graft-network; and updating initial network privileges of the computing device based on the analyzed activity.

Example 33 includes the subject matter of any of Examples 21-32, and, wherein analyzing activity of the computing device comprises analyzing at least one of (i) the type of data exchanged with the another member, (ii) the volume of data exchanged with the another member, (iii) the regularity of communications with the another member, or (iv) historical data indicative of past activity with the another member.

Example 34 includes the subject matter of any of Examples 21-33, and wherein updating the initial network privileges comprises increasing the types of data accessible by the computing device over the graft-network.

Example 35 includes the subject matter of any of Examples 21-34, and wherein updating the initial network privileges comprises increasing the amount of data accessible by the computing device over the graft-network.

Example 36 includes the subject matter of any of Examples 21-35, and wherein updating the initial network privileges comprises increasing the network communication abilities of the computing device over the graft-network.

Example 37 includes the subject matter of any of Examples 21-36, and further including facilitating, by the network infrastructure, communication of the computing device over the communication bus of the graft-network while enforcing the network privileges associated with the computing device.

Example 38 includes the subject matter of any of Examples 21-37, and further including identifying, by the network infrastructure, network privileges of the computing device in response to determining that the computing device is a member of the graft-network and facilitating, by the network infrastructure, communication of the computing device over the communication bus of the graft-network while enforcing the network privileges of the computing device.

Example 39 includes the subject matter of any of Examples 21-38, and wherein identifying the network privileges of the computing device comprises accessing, by the network infrastructure, a member database to retrieve data indicative of the network privileges of the computing device.

Example 40 includes the subject matter of any of Examples 21-39, and wherein the computing device comprises a smart appliance, smart clothing, a smart accessory, or a smart tool.

Example 41 includes one or more computer-readable storage media comprising a plurality of instructions stored thereon that, in response to execution, cause a network infrastructure to perform the method of any of Examples 21-40.

Example 42 includes a network infrastructure for authenticating a user, the wearable computing device comprising means for performing the method of any of Examples 21-40.

The invention claimed is:

1. A network infrastructure for managing network privileges of members of a graft-network, the network infrastructure comprising:
a communication bus;
a network member detection module to (i) detect a computing device in physical presence with the network infrastructure and (ii) determine whether the computing device is a member of the graft-network;
a network privileges management module to set initial network privileges for the computing device in response to a determination that the computing device is not a member of the graft-network, wherein the initial network privileges indicate an ability of the computing device to transmit and receive data over the communication bus,
wherein the network privileges management module is further to selectively increase or decrease the initial network privileges of the computing device as a function of at least an amount of time for which the computing device has been within a predefined physical proximity of the network infrastructure.

2. The network infrastructure of claim 1, wherein to detect the computing device in physical presence with the network infrastructure comprises to determine whether the computing device is in physical contact with the communication bus of the network infrastructure.

3. The network infrastructure of claim 1, wherein to detect the computing device in physical presence with the network infrastructure comprises to determine whether the computing device is within a reference communication range with the communication bus of the network infrastructure.

4. The network infrastructure of claim 1, wherein to set the initial network privileges for the computing device comprises to:
determine a context state of the computing device; and
set the initial privileges based on the determined context state.

5. The network infrastructure of claim 4, wherein to determine the context state of the computing device comprises to determine whether the context state of the computing device has been set to an original equipment manufacturer context state.

6. The network infrastructure of claim 1, wherein to set the initial network privileges for the computing device comprises to:
determine a set of attributes of the computing device; and
set the initial privileges based on the determined set of attributes.

7. The network infrastructure of claim 1, wherein to update the initial network privileges comprises to update initial network privileges of the computing device based on a trust attestation received from another member of the graft-network.

8. The network infrastructure of claim 1, wherein the network privileges management module is further to facilitate communication of the computing device over the communication bus of the graft-network and enforce the network privileges associated with the computing device.

9. The network infrastructure of claim 1, wherein network privileges management module is further to:
identify network privileges of the computing device in response to a determination that the computing device is a member of the graft-network and
facilitate communication of the computing device over a communication bus of the graft-network and enforce the network privileges of the computing device.

10. The network infrastructure of claim 1, wherein to set the initial network privileges comprises to:
determine whether the computing device has communicated with at least one other computing device that is not a member of the graft-network; and
deny, in response to a determination that the computing device has communicated with at least one other computing device that is not a member of the graft-network, a network privilege of the computing device to transmit data on the graft-network.

11. One or more non-transitory computer-readable storage media comprising a plurality of instructions stored thereon that, in response to execution, cause a network infrastructure to:
detect a computing device in physical presence with the network infrastructure;
determine whether the computing device is a member of a graft-network;
set initial network privileges for the computing device in response to determining that the computing device is not a member of the graft-network, wherein the initial network privileges indicate an ability of the computing device to transmit and receive data over a communication bus of the network infrastructure; and
selectively increase or decrease the initial network privileges of the computing device as a function of at least an amount of time for which the computing device has been within a predefined physical proximity of the network infrastructure.

12. The one or more non-transitory computer-readable storage media of claim 11, wherein to detect the computing device in physical presence with the network infrastructure comprises to detect whether the computing device is in physical contact with the communication bus of the network infrastructure.

13. The one or more non-transitory computer-readable storage media of claim 11, wherein to detect the computing device in physical presence with the network infrastructure comprises to detect whether the computing device is within a reference communication range with the communication bus of the network infrastructure.

14. The one or more non-transitory computer-readable storage media of claim 11, wherein to set the initial network privileges for the computing device comprises to:
determine a context state of the computing device; and
set the initial privileges based on the determined context state.

15. The one or more non-transitory computer-readable storage media of claim 14, wherein to determine the context state of the computing device comprises to determine whether the context state of the computing device has been set to an original equipment manufacturer context state.

16. The one or more non-transitory computer-readable storage media of claim 11, wherein to set the initial network privileges for the computing device comprises to:
determine a set of attributes of the computing device; and
set the initial privileges based on the determined set of attributes.

17. The one or more non-transitory computer-readable storage media of claim 11, wherein the plurality of instructions further cause the network infrastructure to facilitate communication of the computing device over the communication bus of the graft-network while enforcing the network privileges associated with the computing device.

18. The one or more non-transitory computer-readable storage media of claim 11, wherein the plurality of instructions further cause the network infrastructure to:

identify, by the network infrastructure, network privileges of the computing device in response to determining that the computing device is a member of the graft-network and facilitate, by the network infrastructure, communication of the computing device over the communication bus of the graft-network while enforcing the network privileges of the computing device.

19. A method for managing network privileges of members of a graft-network, the method comprising:

detecting, by a network infrastructure of the graft-network, a computing device in physical presence with the network infrastructure;

determining, by the network infrastructure, whether the computing device is a member of the graft-network;

setting, by the network infrastructure, initial network privileges for the computing device in response to determining that the computing device is not a member of the graft-network, wherein the initial network privileges indicate an ability of the computing device to transmit and receive data over a communication bus of the network infrastructure; and selectively increasing or decreasing the initial network privileges of the computing device as a function of at least an amount of time for which the computing device has been within a predefined physical proximity of the network infrastructure.

20. The method of claim 19, wherein detecting the computing device in physical presence with the network infrastructure comprises determining whether the computing device is in physical contact with the communication bus of the network infrastructure.

21. The method of claim 19, wherein detecting the computing device in physical presence with the network infrastructure comprises determining whether the computing device is within a reference communication range with the communication bus of the network infrastructure.

22. The method of claim 19, wherein setting the initial network privileges for the computing device comprises:
determining a context state of the computing device; and
setting the initial privileges based on the determined context state.

23. The method of claim 22, wherein determining the context state of the computing device comprises determining whether the context state of the computing device has been set to an original equipment manufacturer context state.

24. The method of claim 19, wherein setting the initial network privileges for the computing device comprises:
determining a set of attributes of the computing device; and
setting the initial privileges based on the determined set of attributes.

25. The method of claim 19, further comprising facilitating, by the network infrastructure, communication of the computing device over the communication bus of the graft-network while enforcing the network privileges associated with the computing device.

* * * * *